(12) United States Patent
Ogino et al.

(10) Patent No.: US 7,832,062 B2
(45) Date of Patent: Nov. 16, 2010

(54) BOOT BAND (75) Inventors: Takashi Ogino, Komagane (JP);
Toshiya Migita, Komagane (JP)

(73) Assignee: NHK Spring Co., Ltd. (JP)

( * ) Notice: Subject to any disclaimer, the term of this patent is extended or adjusted under 35 U.S.C. 154(b) by 259 days.

(21) Appl. No.: 10/568,867

(22) PCT Filed: Aug. 18, 2004

(86) PCT No.: PCT/JP2004/011841

§ 371 (c)(1),
(2), (4) Date: Feb. 21, 2006

(87) PCT Pub. No.: WO2005/017371

PCT Pub. Date: Feb. 24, 2005

(65) Prior Publication Data

US 2006/0218755 A1    Oct. 5, 2006

(30) Foreign Application Priority Data

Aug. 19, 2003 (JP) ............................. 2003-295714

(51) Int. Cl.
*F16L 33/02* (2006.01)
(52) U.S. Cl. ..................................... 24/20 R; 24/20 CW
(58) Field of Classification Search ................ 24/20 R, 24/20 CW, 20 EE, 20 TT, 20 W; 33/555.4
See application file for complete search history.

(56) References Cited

U.S. PATENT DOCUMENTS 1,096,206 A * 5/1914 Thomas ..................... 33/514.2
4,299,012 A   11/1981 Oetiker
5,138,747 A * 8/1992 Oetiker ..................... 24/20 R (Continued)

FOREIGN PATENT DOCUMENTS

DE    1500795    8/1969

(Continued)

OTHER PUBLICATIONS

Microfilm of the Specification and Drawings Annexed to the Request of Japanese Utility Model Application No. 28970/1990 (Laid-Open No. 119603/1991) (Koyo Seiko Co., Ltd.) Dec. 10, 1991, Full Text; Figs 1 to 4.

(Continued)

*Primary Examiner*—James R Brittain
(74) *Attorney, Agent, or Firm*—Lowe Hauptman Ham & Berner, LLP (57) ABSTRACT

The amount of fastening caused by clamping an ear part 4 is confirmed with a simple structure. A boot band consists comprises: a band 1 that is wound—on a member to be fastened to another member—in such a ring shape that the band's overlapping part 2 overlaps the band's overlapped part 6; an ear part 4 that rises on the overlapping part 2 so as to fasten the band 1 by causing plastic deformation in the longitudinal direction of the band 1; a visual-monitoring means 13 for making it possible to monitor the overlapped part 6 from the outside of the overlapping part 2; and a marker means 14 and 15, which are provided on the overlapping part 2 and the overlapped part 6 so as to correspond to the visual-monitoring means 13 so as to monitor the amount of fastening of the band 1 based on the deformation of the ear part 4.

12 Claims, 8 Drawing Sheets

U.S. PATENT DOCUMENTS

| | | | |
|---|---|---|---|
| 5,544,392 A | 8/1996 | Oetiker | |
| 6,560,823 B1 * | 5/2003 | Craig, Jr. | 24/19 |
| 7,024,731 B2 * | 4/2006 | Craig, Jr. | 24/20 CW |

FOREIGN PATENT DOCUMENTS

| | | |
|---|---|---|
| EP | 0697544 | 2/1996 |
| JP | 2000-069651 A | 3/2000 |
| WO | 00/70260 A1 | 11/2000 |

OTHER PUBLICATIONS

Microfilm of the Specification and Drawings Annexed to the Request of Japanese Utility Model Application No. 36596/1900 (Laid-Open No. 127806/1991) (NSK Ltd.), Dec. 24, 1991, Full Text; Figs 1 to 3.

Microfilm of the Specification and Drawings Annexed to the Request of Japanese Utility Model Application No. 32590/1990 (Laid-Open No. 123103/1991) (Nissan Diesel Motor Co., Ltd.), Dec. 16, 1991, Full Text; Figs 1 to 5.

* cited by examiner

BOOT BAND

FIELD OF THE INVENTION

The present invention relates to a boot band that is used to fasten a boot made of rubber or resin to another member, and relates especially to a boot band that enables simple and accurate monitoring of its fastening state when the boot band is being wound around a boot.

BACKGROUND OF THE INVENTION

A boot made of rubber or resin is used as a part in automobiles. In this specification, a boot includes a cylindrical member such as a hose and tube. A boot band made of a metal belt is used to fasten a boot to another member, by clamping the ear part of the boot band so as to achieve the fastening (see Patent Documents 1 and 2). The boot band has a structure such that the band member (a pressed strip) is wound in its longitudinal direction so that one end of the band overlaps its other end.

Figure 1:
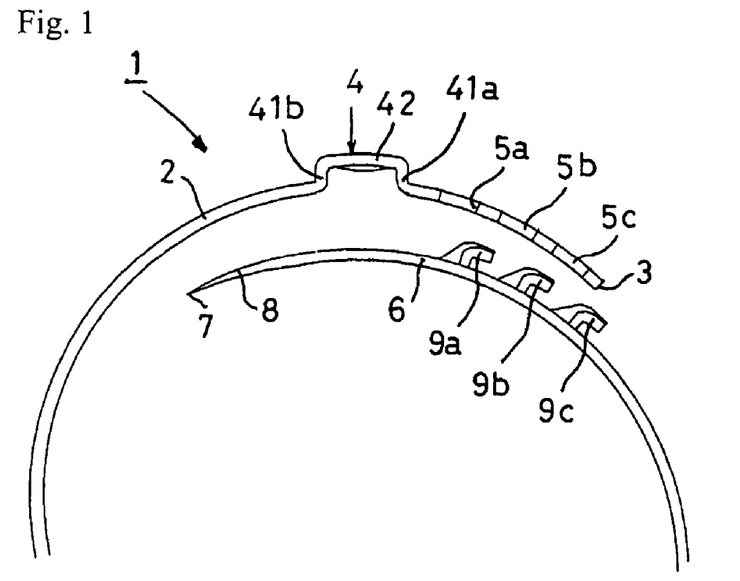
FIG. 1 is a side view of the boot band.

Specifically, as shown in FIG. 1, a band 1 is provided with engagement holes 5a, 5b, 5c between the band's ear part 4 (bent into the shape of a box) and the band's edge 3 in the longitudinal direction of the band's overlapping part 2. The ear part 4 consists of legs 41a, 41b and a bridge 42, and is formed so as to protrude outward in the radial direction of the band 1 on the overlapping part 2 The overlapped part 6 is provided with a flattened part 8, whose thickness decreases towards the edge 7 of the overlapped part 6, and engagement claws 9a, 9b, 9c, which engage with said engagement holes 5a, 5b, 5c, protruding outwards in the radial direction of the band 1 after being inserted into said engagement holes 5a, 5b, 5c.

Figure 2:
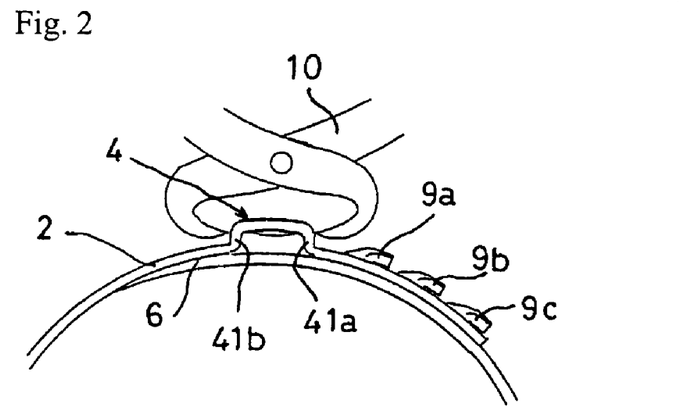
FIG. 2 is a side view of the ear part being clamped.
Figure 3:
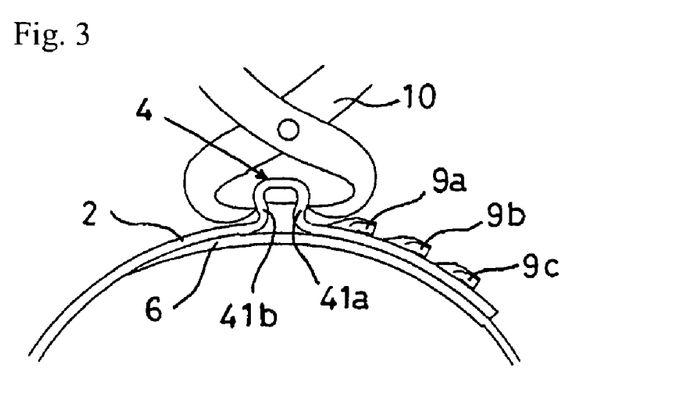
FIG. 3 is a side view of the ear part after it has been clamped.
Figure 4:
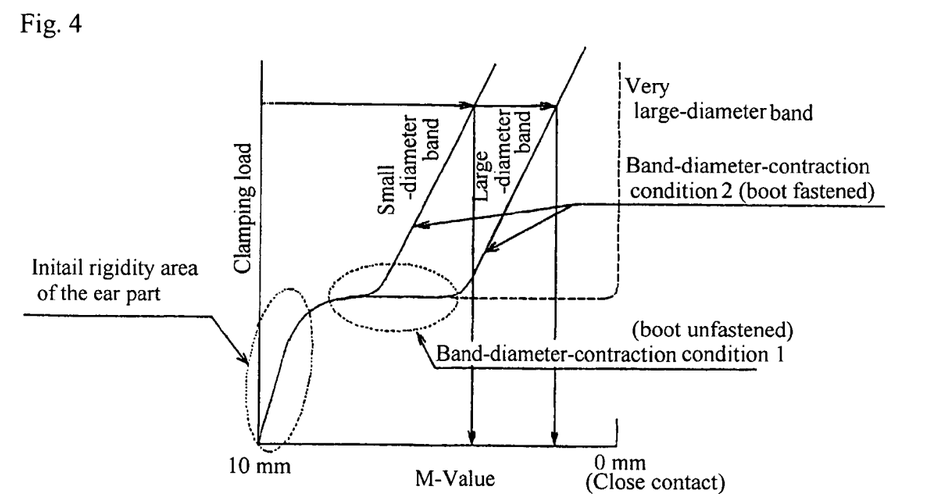
FIG. 4 shows the relationship between the distance between the legs of the ear part (M value) and the clamping load.

One procedure for fastening the boot band of this type, as shown in FIGS. 2 and 3, is to use a clamping tool 10 to clamp the ear part 4 so as to plastically deform said ear part 4 by forcing the legs 41a and 41b of the band 1 to become shorter, by applying load from the outside (in terms of the band's longitudinal direction) of the legs 41a and 41b. The deformation of the ear part 4 shortens the length of the band 1 and enables the boot to be fastened to the member to which it is to be fastened. Control of such clamping is carried out as described below:

When the clamping load to be applied to the ear part 4 is constant, a band whose diameter is large (i.e., whose length is long), the difference between the band's diameter and the boot's diameter is large. However, because the extent to which the ear part 4 can be deformed is constant, the extent to which the diameter of the band can be reduced is constant regardless of size of the diameter of the band; that is to say, the extent to which the diameter of the band can be reduced= [initial distance between the legs of the ear part, 10 mm–the distance between the legs when the legs are in close contact with each other, 0 mm]/p=less than Φ3 mm. Therefore, the extent to which a large diameter band fastens a boot is smaller than that of a small-diameter (short length) band, and therefore the reaction force from the boot is smaller. FIG. 4 shows the relation between the clamping load and the distance between legs in cases of a very-large-diameter band, a large-diameter band, and a small-diameter band, assuming that the distance between the legs 41a and 41b before clamping (initial distance between the legs) is 10 mm. As shown in FIG. 4, in the case of a large-diameter band, the distance of the legs of the ear part after clamping (here, this distance is called the M value) tends to be less because the boot's contraction (the boot's reaction force)—which prevents deformation of the ear part—is small. In contrast, in the case of a small-diameter band, the M value tends to be larger because the clearance between the band and the boot is so small that the contraction of the boot (reaction of the boot) is large. In this connection, by controlling the M value, it is possible to determine how large or small the diameters—in other words, the approximate diameters—of the components (such as band and joint) should be. In the process of fastening bands in a mass-production line, the M value is used—as an alternative for a value that represents a change in the diameter of a fastened band— to control the range of diameters of the components.

Patent Document 1: International Publication WO 00-70260 (FIG. 1). Patent Document 2: U.S. Pat. No. 4,299, 012 (Specification).

Figure 5:
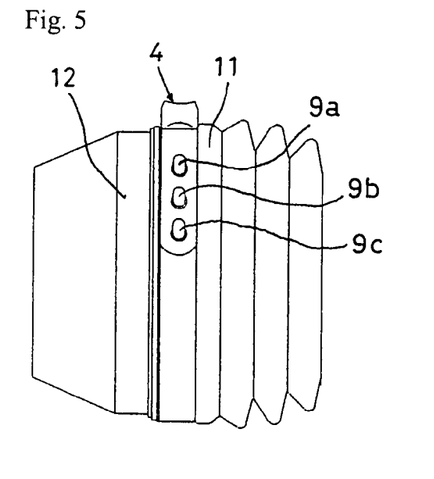
FIG. 5 is a plan view of a band that is attached to a member to which it is to be fastened.

In the step of confirming the M value in the process of fastening the band by clamping the ear part as shown in Patent Documents 1 and 2, the decision as to whether the fastening is good or not is made using an inspection tool such as a gap gauge or a slide gauge. However, confirmation of the M value is very difficult, because the distance (gap) between the legs of the ear part—which must be measured in order to obtain the M value—is about 2 mm after clamping, and there is much structural hindrance due to the members to be connected, such as the lips of both an outer race 12 and a boot 11, as shown in FIG. 5. Therefore, the process—getting the inspection tool, measuring the gap, and putting away the tool—takes a very long time, resulting in very poor productivity. Further, to determine whether the fastening state is good or bad only by referring to the M value has limitations, because the rising parts of the legs 41a and 41b of the ear part 4 elongate due to plastic deformation caused by the clamping. However, to accurately measure the diameter of the band 1—as an alternative to confirmation of the M value—is even more difficult than measuring the M value.

One of the features of the boot band in Patent Document 1 is that—in order to prevent over-fastening that can cause breakage of a boot—engagement holes are provided so that the band has portions that have the smallest cross-sections (i.e., weakest portions) and that stretch when the band is being fastened, and because of which the amount of fastening on the boot can be suitably adjusted.

However, in the case of the band disclosed in Patent Document 1, either (1) a band that has a diameter smaller than the lower limit of the standard diameter, or (2) a joint that has a diameter larger than the upper limit of the standard diameter causes a large amount of fastening on the boot, so that the reaction force of the boot increases. The weakest portion stretches greatly due to plastic deformation, and the M value becomes small although the apparent diameter does not change. Accordingly, the M value becomes similar to that in a case in which there is no stretching caused by plastic deformation, and therefore it is not possible to detect if the diameter of either the boot or the joint is not standard. In this case, the band experiences stronger-than-normal tension, and therefore the band's weakest part can break. In order to assess the band's condition when the band's weakest part has elongated due to plastic deformation, it is necessary to determine both the M value and the extent to which the engagement hole 5a (weakest part) has elongated by visually inspecting the appearance of the band after fastening. Although the M value is used as an alternative characteristic instead of the change in the diameter of the band after it has been fastened, the elongation of the band due to plastic deformation affects the actual size, so that any abnormality of the size of the components cannot be detected, resulting in uncertainty and unreliability of the M value used as a measuring means of the components. It is desirable that the characteristic value for controlling the fastening of a clamping-type boot band be a value that directly reflects changes in the diameter of the band.

The present invention has been made to solve the problems described above, and the objective of the present invention is to provide a clamping-type boot band that enables (1) direct measurement of changes in the diameter of the band during the process of fastening the band, and (2) easy and accurate judgment as to whether a fastening state is good or bad without needing to use a measuring tool.

DISCLOSURE OF THE INVENTION

To achieve the objective described above, the boot band of the present invention comprises: a band that is formed in a ring shape in such a way that one end of the band overlaps the other end so that the band can be wound around a member to which the band is to be fastened, an ear part that rises from the overlapping part and that can be plastically deformed in the longitudinal direction of the band so as to fasten the band, a visual-monitoring means that is arranged at the overlapping part of the band so as to make it possible to visually inspect the overlapped part in relation to the overlapping part, and a marker means that is arranged at the overlapping and overlapped parts so as to correspond to the visual-monitoring means, and that enables monitoring of the amount of fastening of the band as effected by the plastic deformation of the ear part.

The visual-monitoring means is preferably a window opened in the overlapping part, but it could instead be notches on the edges of the overlapping part. The marker means is preferably provided with a display part on the overlapping or overlapped part, and with an indicator part, also on the overlapping or overlapped part, that is displaced relatively against the display part due to plastic deformation of the ear part. The display part is preferably arranged to be a marker for indicating the relative displacement in the longitudinal direction of the overlapping and overlapped parts, while the indicator part is preferably arranged so as to be a marker for indicating whether the position of the display part is satisfactory after displacement of the display part due to plastic deformation of the ear part. Further, the display part is preferably (a) projections that is/are formed on either the overlapping part or the overlapped part so as to engage with each other. The display part is preferably (a) projections formed by cutting and raising the overlapped part, while the indicator part is a scale that is engraved along the longitudinal direction of the overlapping part. The edge part of the projection formed by said cutting and raising is preferably bent so as to slide in the band's longitudinal direction on the outside surface of the overlapping part, but said edge part might instead have a tapered shape such that the width of the band narrows towards the longitudinal end of the band. Further, a part of the engraved scale can be painted.

EXPLANATIONS OF NUMBERS USED IN THE DRAWINGS

1 band
2 overlapping part
4 ear part
6 overlapped part
13 window
14 projection
15 scale
23 slit
25 projection
27 notch

DESCRIPTION OF THE PREFERRED EMBODIMENTS

Preferred embodiments of the present invention will now be described in detail, referring to the drawings.

In each embodiment, the same number or other character is used to refer to means that have the same function(s) or members that are the same, including the boot band in FIGS. 1 to 5.

First Embodiment

Figure 6:
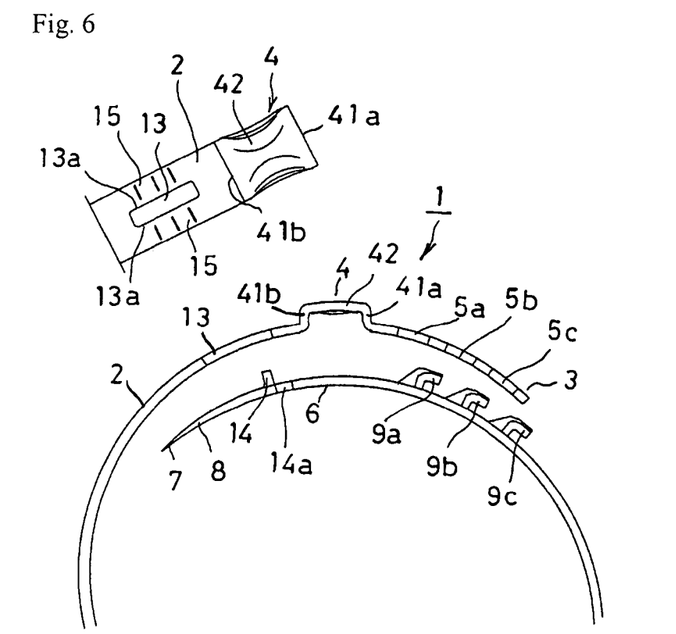
FIG. 6 is a side view of the first embodiment of the present invention.

FIG. 6 is a side cross-sectional view and a partial plan view of the relevant part of the boot band of the first embodiment of the present invention. In the first embodiment of the present invention, the boot band is a band 1 that is a belt-like member made of a metal such as stainless steel, and that is wound around a boot (not shown) that is the member to be fastened, with said band 1 being formed in a ring shape in such a way that an overlapping part 2 overlaps an overlapped part 6. The overlapping part 2 is provided with engagement holes 5a, 5b, 5c between its longitudinal end 3 and its ear part 4. The ear part consists of legs 41a, 41b, and a bridge 42, and is formed in the overlapping part 2 of the band 1 so as to protrude outward in the radial direction. The overlapped part 6 is provided with a flattened part 8 whose thickness decreases toward the longitudinal end 7 of the overlapped part 6, and with engagement claws 9a, 9b, 9c that engage with said engagement holes 5a, 5b, 5c, with the edges of said engagement claws 9a, 9b, 9c protruding outward in the radial direction of the band 1 and being bent toward the longitudinal end 3 of the overlapping part 2.

As is similar to the arrangement shown in FIG. 5, the boot band is wound around the boot 11 that is the member to be fastened to a cylindrical member 12. And as is similar to the arrangement shown in FIGS. 2 and 3, the ear part 4 is clamped by a clamping tool 10 so as to deform plastically the ear part 4 by forcing the distance between the legs 41a and 41b to become shorter due to the load that is applied from outside of the legs 41a and 41b. Also, as is the same with a conventional boot band, the plastic deformation of the ear part 4 shortens the length of the band 1 and fastens the boot, which is the member to be fastened.

In this embodiment of the present invention, the overlapping part 2 of the boot band is provided with a window 13—which is intended as a visual-monitoring means for monitoring the overlapped part 6 from the outside of the overlapping part 2. The window 13 is located farther from the edge 3 than from the ear part 4—in the longitudinal direction of the overlapping part 2, and is formed at the width-wise center of the overlapping part 2 in such a fastened state that the overlapping part 2 overlaps the overlapped part 6 after the ear part 4 has been clamped. The window 13 is longer in the longitudinal direction than is the distance between the legs 41a and 41b of the ear part 4, and this distance represents the maximum possible plastic deformation of the ear part 4. Further, the width (length in the band's width direction; i.e., the cross-sectional length) of the window 13 is formed so as to be sufficiently smaller than the width of the engagement holes 5a, 5b, 5c. Thus, the rigidity of the window part 13 is greater than that of the engagement holes 5a, 5b, 5c, which prevents the window 13 from elongating due to plastic deformation.

On the overlapped part 6, a projection 14, which is intended as a display part of the marker means, is formed at a location corresponding to the edge of the ear part 4 side in the longitudinal direction of the window 13, so that the projection serves as a marker indicating the relative displacement of the overlapping part 2 and the overlapped part 6 due to plastic deformation of the clamped ear part 4. In this embodiment, the projection 14 is formed by cutting and raising a small specified part of the overlapped part 6 in the width direction of the overlapped part 6. In FIGS. 6 to 9, the number 14a designates a hole that is formed in the overlapped part 6 after cutting and raising the projection 14. On the overlapping part 2, a scale 15 is provided as an indicator of the marker means in such a way that (1) the scale 15 undergoes relative displacement, due to plastic deformation, against the projection 14 that is intended as the display part, and that (2) the scale 15 serves as a marker for determining whether the location of the projection 14 is good after the relative displacement due to plastic deformation. In this embodiment, the scale 15 is engraved on the outside periphery of the overlapping part 2 as three marks at predetermined intervals along the edges 13a on both sides in the width direction of the window 13. Further, in this embodiment, the projection 14 as the display part is formed concurrently with the engagement holes 9a, 9b, 9c, while the window 13 as the marker means is formed concurrently with the engagement holes 5a, 5b, 5c; as a result. Therefore, there is no error in forming process.

Figure 7:
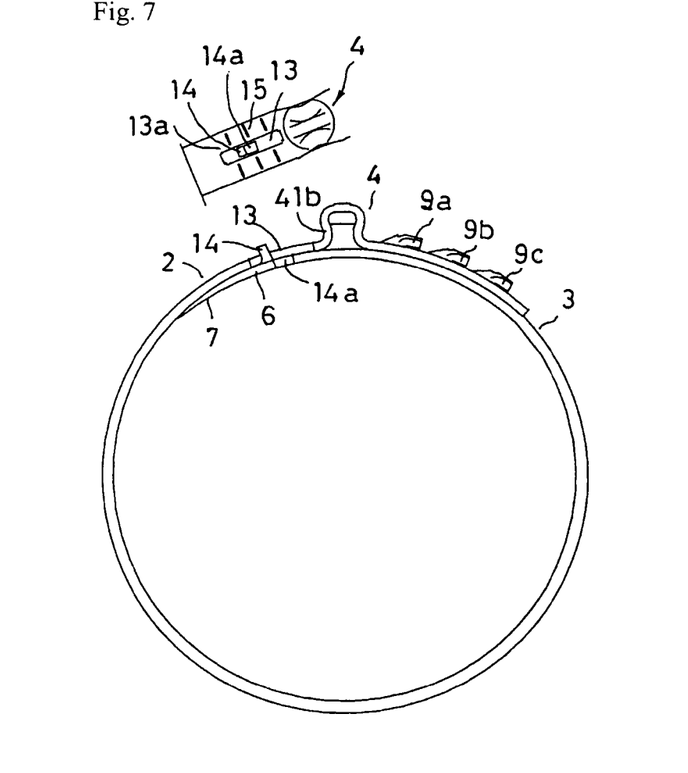
FIG. 7 is a diagram used in explaining the performance of the first embodiment.
Figure 8:
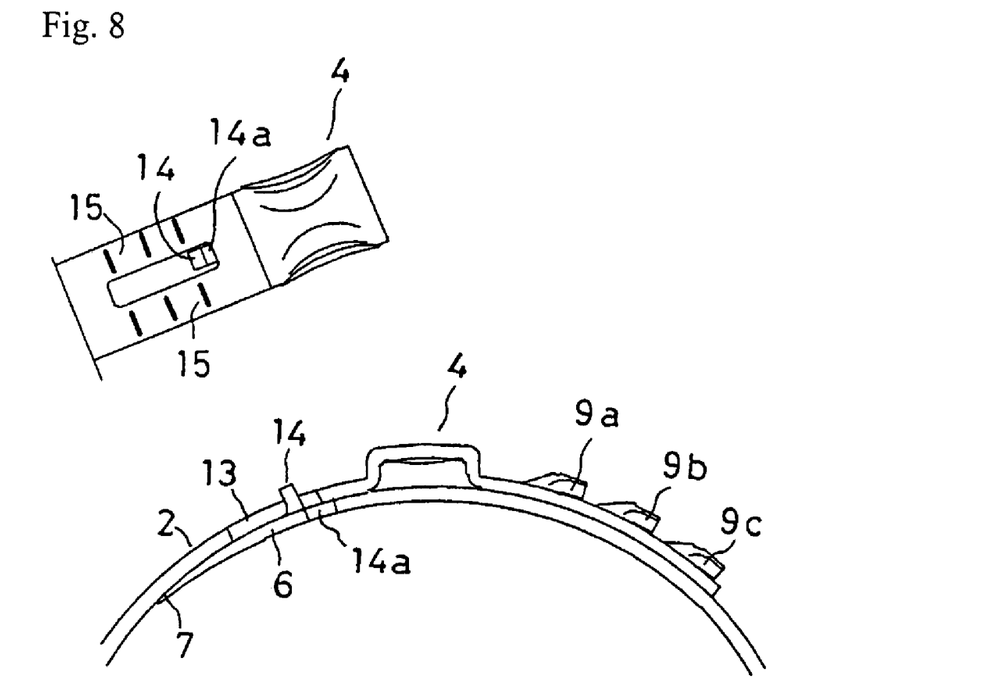
FIG. 8 is a side view and a partial plan view of the first embodiment before the clamping of the ear part.
Figure 9:
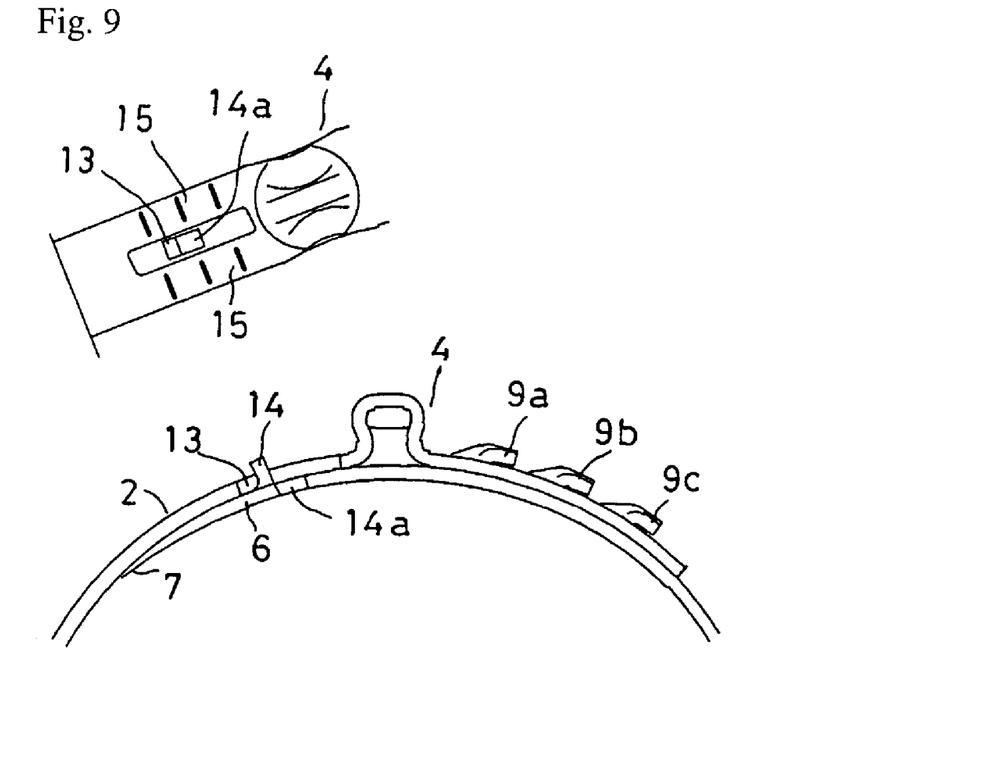
FIG. 9 is a side view and a partial plan view of the first embodiment after the ear part has been clamped.

In the case of this embodiment of the boot band, the band 1 maintains a condition such that its diameter is reduced due to such plastic deformation that the distance between the legs of the ear part 14 decreases after the ear part 4 is clamped by applying a constant load. If an excessive load is applied in clamping the ear part 4, the weakest part of the band 1—i.e., the engagement hole 5a—elongates due to plastic deformation, being overcome by the reaction force from the boot. In contrast, the area from the projection 14 of the overlapped part 6 to the window 13 of the overlapping part 2, including the window 13—which is an area that covers about one circuit of the band—has a sufficient cross-sectional area with respect to that of the engagement hole 5a (the weakest part), and therefore this area (the area from the projection 14 of the overlapped part 6 to the window 13 of the overlapping part 2, including the window 13) does not undergo plastic deformation when the load is applied (FIG. 7). In accordance with this, the relative displacement (stroke) between the projection 14 (which serves as the display part that indicates how much the diameter has been reduced after clamping) and the window 13, and between the projection 14 and the scale 15 (which serves as the indicator engraved along the edges 13a of the window 13), indicates the amount of reduction of the diameter of the band 1 after clamping. This displacement directly indicates variation in the diameter of the band 1, and therefore is suitable as an indicator that shows the fastening state (FIGS. 8 and 9). A judgment as to whether the fastening state after clamping is good can be made by monitoring the position of the projection 14 relative to the scale 15. This saves the labor that would be needed for using a gauge, and it allows monitoring of the fastening state by visual inspection from outside the band 1.

Figure 10:
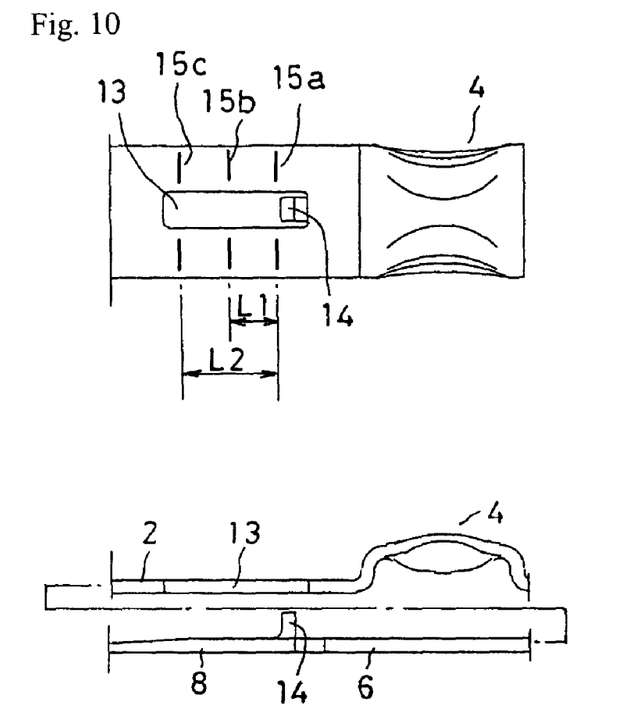
FIG. 10 is a partially enlarged plan view of the first embodiment.

The scale 15 in the first embodiment of the present invention consists of three marks 15a, 15b, 15c at fixed intervals, and is formed as follows. As shown in FIG. 10, which is an enlarged plan view of the relevant part, the mark 15a is engraved so as to correspond to the position of the projection 14 before fastening (clamping). The mark 15b is engraved at a position that is apart from the mark 15a by the distance L1. The mark 15b corresponds to the lower limit of the acceptable range of fastening as the position of the projection 14 after clamping. When the position of the projection 14 after clamping does not reach that lower limit—under the conditions that the diameter of the boot is the minimum of the tolerance range and that the diameter $D_0$ of the band before clamping is the maximum of the tolerance range—grease can leak due to lack of fastening of the boot (the member to be fastened). Also, the mark 15b is engraved in such a manner that—under the conditions that the diameter of the boot is the maximum of the tolerance (standard) range, and that the diameter of the band $D_0$ before clamping is the minimum of the tolerance range—the distance L1 meets the following condition: $Dmax = D_0 - (L1/\pi)$ [Here, Dmax is the maximum acceptable diameter of the band after clamping, which does not break the boot]. The mark 15c is engraved at a position that is apart from the mark 15a by the distance L2. The mark 15c corresponds to the upper limit of the acceptable range of fastening as the position of the projection 14 after clamping. When the position of the projection 14 goes beyond the upper limit—under the conditions that the diameter of the boot is the maximum of the tolerance range and that the diameter of the band $D_0$ before clamping is the minimum of the tolerance range—the boot can break. Also, the mark 15c is engraved in such a manner that—under conditions that the diameter of the boot is the minimum of the tolerance range and that the diameter of the band $D_0$ before clamping is the maximum acceptable—the distance L2 meets the following condition: Dmin=$D_0$−(L2/π) [Here, Dmin is the minimum acceptable diameter of the band after clamping, which does not cause leakage of grease]. The mark 15a can be omitted, leaving two marks 15b and 15c. Also, an engraving having the shape of a line or a band that connects the mark 15b with the mark 15c—or an engraving having any other shape—can be employed, provided that the engraving indicates the acceptable range of fastening within which the projection 14 should be located after clamping.

Figure 11:
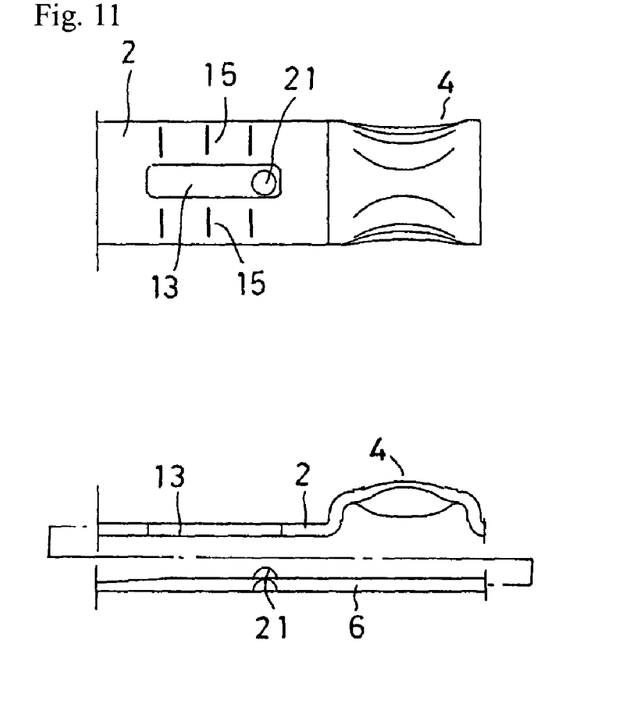
FIG. 11 is a side view and a partial plan view of a variation of the first embodiment.
Figure 12:
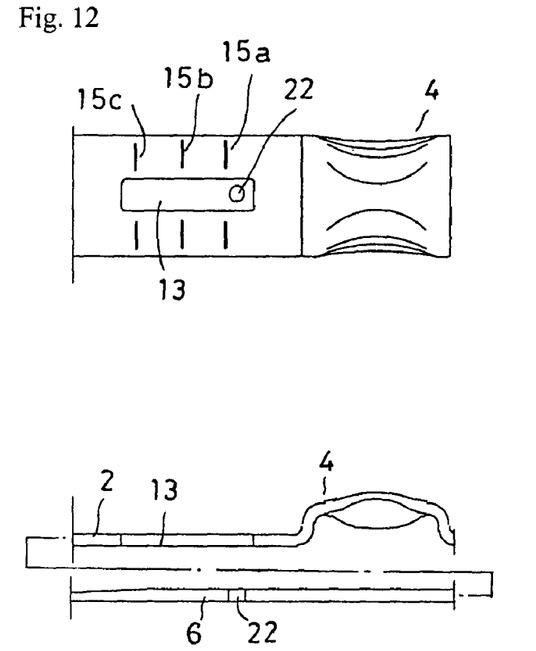
FIG. 12 is a side view and a partial plan view of another variation of the first embodiment.

FIGS. 11 and 12 show variations of the first embodiment. In the embodiment of FIG. 11, a dowel 21 is formed at the longitudinal edge of the overlapped part 6. The dowel 21 is formed on the overlapped part 6 so as to be an arc-like shaped projection corresponding to the window 13 that is the visual-monitoring means formed on the overlapping part 2. The dowel 21 becomes the display part of a marker means corresponding to the window 13 when the band 1 is wound in the shape of a ring. A judgment as to whether the fastening of the boot band is good is easily done by monitoring the dowel 21 from the window 13 on the overlapping part 2.

In the embodiment shown in FIG. 12, a through-hole 22—instead of the dowel 21—is formed as a display of the marker means at the position corresponding to the dowel 21. The diameter of the through-hole 22 is smaller than or approximately equal to the width of the window 13 on the overlapping part 2, making it possible to monitor the through-hole 22 from the window 13. A judgment as to whether the fastening state of the boot band is good can also be made with this through-hole 22. In the embodiment of FIG. 12, the window 13 as the visual-monitoring means need not be longer—and can be shorter—in the longitudinal direction than the amount of plastic deformation of the ear part 4, provided that the area of the marks 15b and 15c in the longitudinal direction can be monitored from the outside of the overlapping part 2.

Second Embodiment

Figure 13:
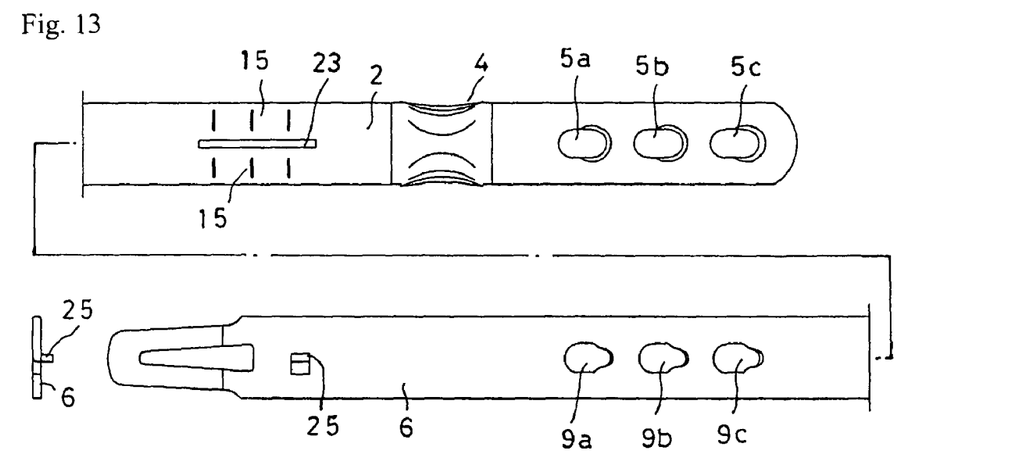
FIG. 13 is a plan view and a cross-sectional view of a second embodiment of the present invention.

FIG. 13 shows the boot band in a second embodiment. In the boot band of this embodiment, a slit 23 is formed as the visual-monitoring means on the overlapping part 2. The slit 23 is formed in the longitudinal direction of the band 1, with the ear part 4 being located between the slit 23 and the engagement holes 5a, 5b, 5c. The slit 23 is formed so as to stretch in the shape of a strip in the longitudinal direction of the band 1, preventing reduction in the rigidity of the slit 23.

In the overlapped part 6, a projection 25 is formed by cutting and raising so as to correspond to the slit 23. The projection 25, which is the display part of the marker means, is formed by cutting and raising, with the thickness of the projection 25 being almost the same as the width of the slit 23. Therefore, when the projection 25 is inserted into the slit 23, the projection 25 engages with the slit 23. Therefore, a shift in the width direction of the band can be prevented in the area where the overlapping part 2 overlaps the overlapped part 6, resulting in accurate fastening of the boot band. Also in this embodiment, the scale 15 (which is intended as the indicator of the marker means) is formed by engraving, etching, or color painting at the position corresponding to the slit 23 in the overlapping part 2.

Third Embodiment

Figure 14:
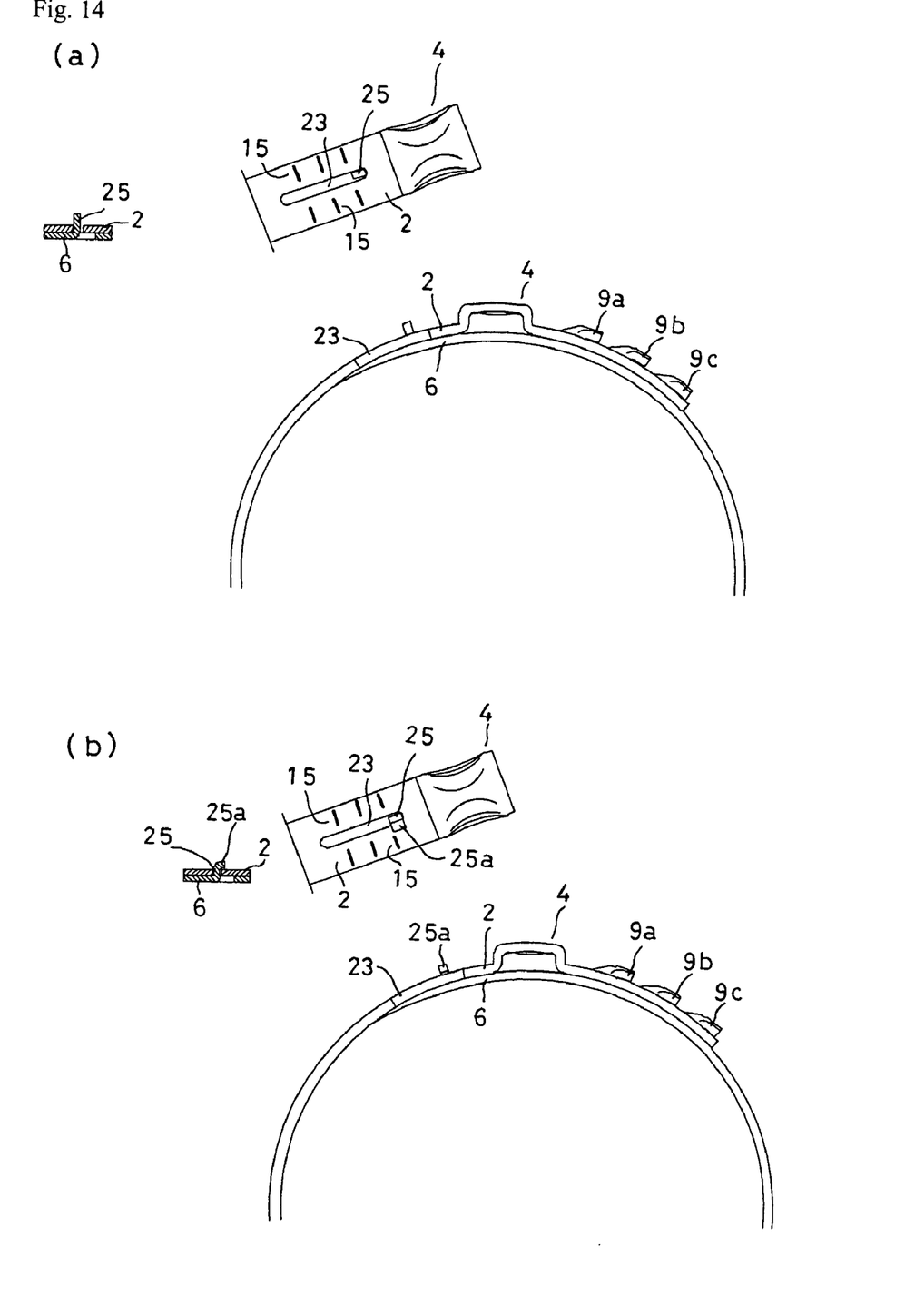
FIG. 14 shows a third embodiment of the present invention; (a) is a side view, partial plan view, and cross-sectional view before the bending of a projection, and (b) is a side view, partial plan view and cross-sectional view after the projection has been bent.

FIG. 14 shows a third embodiment. In this embodiment, the projection 25 is formed by cutting and raising on the overlapped part 6 in the longitudinal direction 1 in such a way that the projection 25 is a little higher than the surrounding area of the overlapped part 6 (see FIG. 14(a)). As a result, after the projection 25 penetrates through the slit 23 of the overlapping part 2, it is easy to bend the projection 25 in the width direction of the band (see FIG. 14(b)). Moreover, the bent part 25a, which has been bent, stretches towards the scale 15 that is arranged around the slit 23 on the overlapping part 2, thus facilitating monitoring of any displacement of the projection 25 that occurs due to clamping.

Fourth Embodiment

Figure 15:
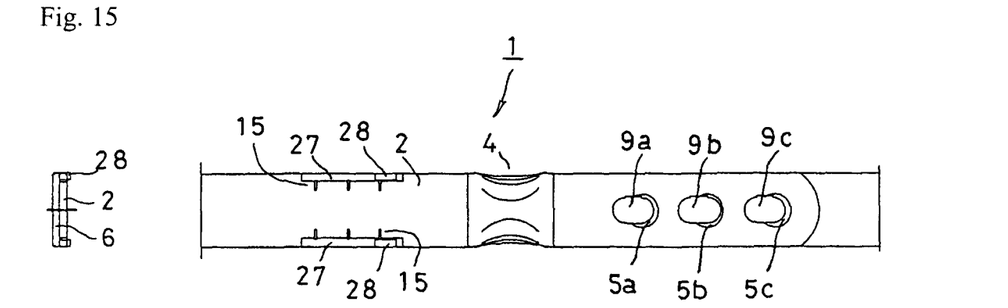
FIG. 15 is a plan view and a cross-sectional view of a fourth embodiment of the present invention.
Figure 16:
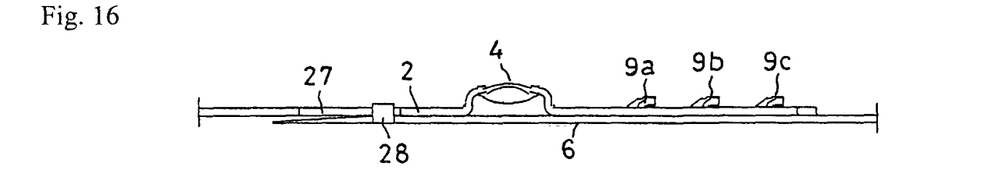
FIG. 16 is a side view of the fourth embodiment.

FIGS. 15 and 16 show a plan view, a cross-sectional view, and a side view of a fourth embodiment. In this embodiment, notches 27 are formed on the overlapping part 2, while projections 28 are formed on the overlapped part 6.

The notches 27 are formed in the longitudinal direction of the band 1 so as to function as a visual-monitoring means, and they are formed in such a way that the ear part 4 is located between the notches 27 and the engagement holes 5a, 5b, 5c. The notches 27 are formed by notching the sides of the overlapping part 2 in the longitudinal direction, and the length of each notch 27 is set to be the same as that of the window 13 in the first embodiment. The notches 27 are formed as a pair on both sides of the overlapping part 2.

A plurality of scales 15 are engraved—as the indicators of the marker means—in the longitudinal direction of the notches 27. Each of the scales 15 is formed to correspond to one pair of notches 27. In this embodiment, the notch 27 is cut out in such a way that the depth of the notch 27 is almost the same as the thickness of the band 1.

In the overlapped part 6, a pair of projections 28 are formed by cutting and raising, as shown in FIG. 16. The pair of projections 28 are formed such that one of them is formed on each side of the overlapped part 6 in the longitudinal direction, so as to correspond to the notches 27 of the band 1 that is wound so as to be in the form of a ring. The projections 28 are inserted into the corresponding notches 27 so as to function as the display part of the marker means. In this embodiment, the depth of each of the notches 27 is almost the same as the thickness of the band 1, and therefore the projections 28 do not protrude in the width direction when the projections 28 are inserted in the notches 27.

In this embodiment, when the band 1 is wound in the shape of a ring, the pair of projections 28 rise along the corresponding notches 27. As a result, when the ear part 4 is clamped so as to fasten the band 1, the projections 28 undergo displacement relative to the scale 15 by plastic deformation, thereby making it possible to judge whether the fastening of the boot band is good.

In this embodiment, the pair of projections 28 are inserted in the pair of notches 27 so that the pair of projections 28 flank the overlapping part 2. Therefore, displacement—in the width direction—of the overlapping part 2 and the overlapped part 6 does not occur, providing the benefit that wobbling or other movement of the boot band in its width direction is reduced.

Figure 17:
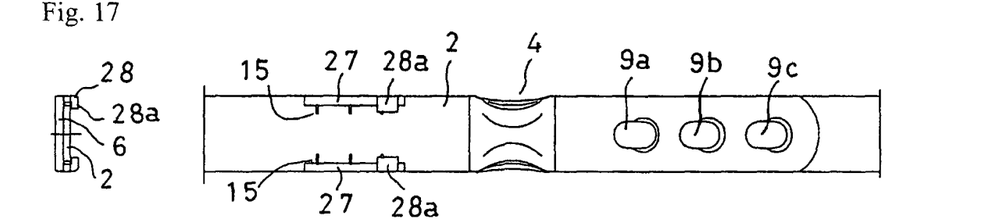
FIG. 17 is a plan view and a cross-sectional view of a variation of the fourth embodiment.
Figure 18:
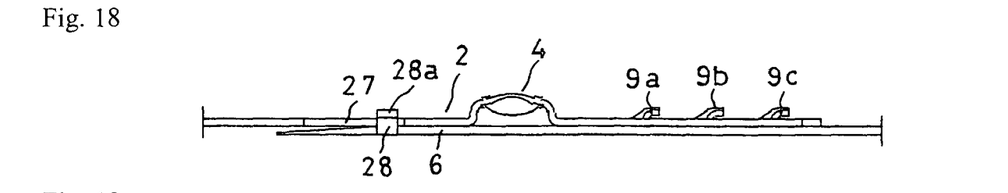
FIG. 18 is a side view of the variation of the fourth embodiment.

FIGS. 17 and 18 show a variation of this embodiment. The pair of projections 28 are bent in such a direction that they come closer to each other. In other words, the projections 28 are bent towards the center of the band in its width direction, so that the bent parts 28a, which are formed by said bending, apply pressure on and thereby hold down the overlapping part 2 from the outside, which prevents the overlapping part 2 from lifting and assures accurate fastening with little rattling.

Fifth Embodiment

Figure 19:
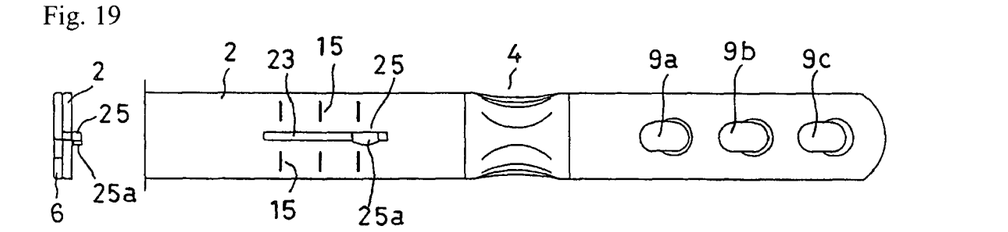
FIG. 19 is a plan view and a cross-sectional view of a first example of a fifth embodiment of the present invention.

FIG. 19 shows the fifth embodiment. This embodiment is a partial variation of the second embodiment shown in FIG. 13. One edge of the projection 25—which is cut and raised from the overlapped part 6, and which penetrates through the slit 23 in the overlapping part 2—is formed in the shape of a triangle. As a result, when the bent part 25a is formed so as to be a sharp-pointed triangle by bending the projection 25 in the width direction of the band, the sharp-pointed triangle faces the scale 15 that is the indicator of the marker means. Therefore, displacement of the projection 25 relative to the scale 15 can be monitored accurately.

Figure 20:
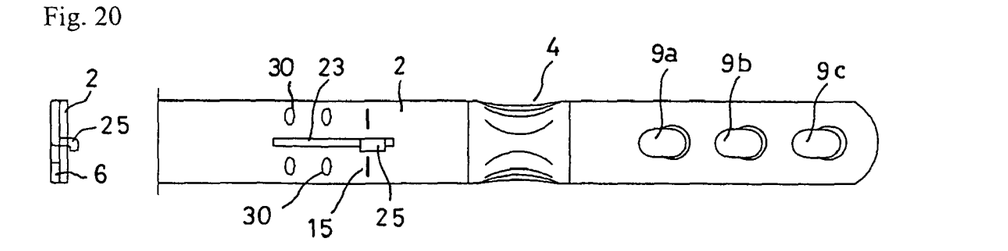
FIG. 20 is a plan view and a cross-sectional view of a second example of the fifth embodiment.

FIG. 20 shows another variation of the second embodiment. Paint 30 for indicating the relative distances along the scale 15 is arranged on the scale 15 that is formed as the indicator of the marker means on the overlapping part 2. The paint 30 can be either monochrome or in multiple colors, facilitating easy monitoring of displacement of the projection 25 of the overlapped part 6. In this case, one indicator on the scale 15 can have a color different from that of a neighboring indicator, in which case the different colors make it easy to judge whether fastening of the boot band is good.

The present invention is not limited to the above-mentioned embodiments; it can have other variations. For instance, in the first through fifth embodiments and their variations, the display part of the marker means is formed on the overlapped part 6, while the indicator is formed on the overlapping part 2. However, the display part of the marker means can be formed on the overlapping part 2, while the indicator can be formed on the overlapped part 6. In other words, a display (such as a projection; a dot-shaped mark; or a notch formed at the edge of the window 13) is formed on the overlapping part 2 at the position corresponding to the visual-monitoring means (such as the window 13), while the indicator is formed on the overlapped part 6 at the position corresponding to the visual-monitoring means (such as the window 13). The indicator in this embodiment can be any of the following: a scale; a projection having a longitudinal length (the length corresponding to the distance between the scales 15b and 15c in FIG. 10) that indicates—with the position of the display part after fastening—the acceptable range of fastening; and lines, bands, or arrows of different colors, such as red and green. When the indicator is formed as a scale, lines, or arrows on the overlapped part 6, the visual-monitoring means does not need to be longer in the longitudinal direction than the distance of plastic deformation of the ear part, and it can be shorter in the longitudinal direction, provided that the indicator—which, by the position of the display part after fastening, indicates the acceptable range of fastening—can be monitored from the outside of the overlapping part 2 (this is the same as in the embodiment shown in FIG. 12).

In accordance with this, the present invention allows the display part to be formed—on the outside surface in the radial direction of the overlapping part 2 or the overlapped part 6—in the shape of a dot, a line, a circle, a rectangle, a triangle, a dome, a plate, a square rod, and/or a pyramid, which is done by engraving, painting, notching, cutting and raising, punching, pressing, and/or cutting. The same can be said with regard to the indicator: the indicator can be formed—on the overlapping part 2 or on the overlapped part 6—so as to be a scale's mark in the longitudinal direction, and/or to show a range of length in the longitudinal direction, being in a shape of a dot, a line, a circle, a rectangle, a triangle, a dome, a plate, a square rod, a pyramid, and/or a combination of two or more of these, which is done by engraving, painting, notching, cutting and raising, punching, pressing, and/or cutting.

INDUSTRIAL APPLICABILITY

The boot band in the present invention can directly detect variations in the diameter of the band in the process of fastening. A judgment as to whether the fastening state is good can be made simply and accurately by visual monitoring, without needing an inspection tool.

What is claimed is:

1. A boot band comprising:
    a band that is formed in a ring shape in such a way that a first end of the band overlaps a second end so that the band can be wound around a member to which the band is to be fastened,
    an ear part that rises from an overlapping part of the first end which overlaps a part of the second end of the band and that is plastically deformable in the longitudinal direction of the band so as to fasten the band,
    engagement holes that are arranged on a first side of the ear part in the longitudinal direction of the overlapping part, and engagement claws that are arranged on an overlapped part of the second end and that can be engaged with the engagement holes,
    visual-monitoring means arranged in the overlapping part of the first end of the band for visually inspecting the overlapped part in relation to the overlapping part, and
    marker means, arranged with the visual-monitoring means, for indicating a reduction of a diameter of the band as a result of plastic deformation of the ear part, and for indicating an amount of fastening of the band, including indicating the amount of fastening of the band, as effected by the plastic deformation of the ear part, said amount of fastening of the band being represented by the amount of elongation of the band resulting from plastic deformation occurring at the weakest portion of the band; and
    wherein the visual-monitoring means and the marker means are positioned on a second side of the ear part.

2. The boot band as described in claim 1, wherein the visual-monitoring means is a window opened in the overlapping part.

3. The boot band as described in claim 2, wherein the visual-monitoring means comprises notches on the edges of the overlapping part.

4. The boot band as described in claim 2, wherein the marker means is provided with a display part on the overlapping or overlapped part, and
    an indicator part, also on the overlapping or overlapped part, that is displaced relatively against the display part due to the plastic deformation of the ear part.

5. The boot band as described in claim 1, wherein the visual-monitoring means is notches on the edges of the overlapping part.

6. The boot band as described in claim 5, wherein the marker means is provided with a display part on the overlapping or overlapped part, and
    an indicator part, also on the overlapping or overlapped part, that is displaced relatively against the display part due to the plastic deformation of the ear part.

7. The boot band as described in claim 1, wherein the marker means is provided with a display part on the overlapping or overlapped part, and an indicator part, also on the overlapping or overlapped part, that is displaced relatively against the display part due to the plastic deformation of the ear part.

8. The boot band as described in claim 7, wherein the display part is arranged to be a marker for indicating the relative displacement in the longitudinal direction of the overlapping and overlapped parts, while the indicator part is arranged so as to be a marker for indicating whether the position of the display part is satisfactory after displacement of the display part due to deformation of the ear part.

9. The boot band as described in claim 1, wherein the boot band is stepless.

10. The boot band as described in claim 1, wherein the marker means comprises a mark and a scale respectively provided on one of the overlapping first end and the second end of the band, wherein the mark and the scale are configured to indicate amounts of reduction of the diameter of the band and to provide a visual indication of appropriate fastening limits of the band.

11. The boot band as described in claim 1, wherein the marker means comprises:
   a first mark corresponding to a minimum amount of fastening which clamps a boot being clamped by the band to the degree that fluid leakage from the boot is prevented; and
   a second mark which corresponds to a maximum amount of band fastening which can be tolerated by the boot before damage to the boot occurs.

12. The boot band as described in claim 1, further comprising a third mark corresponding to a state of the band wherein fastening is absent.

* * * * *